United States Patent [19]

Sugawara et al.

[11] Patent Number: 5,081,545
[45] Date of Patent: Jan. 14, 1992

[54] FOCUSING SCREEN

[75] Inventors: Saburo Sugawara; Toshiharu Takahashi; Hideaki Yuda; Moriyasu Shirayanagi, all of Tokyo, Japan

[73] Assignee: Asahi Kogaku Kogyo K.K., Tokyo, Japan

[21] Appl. No.: 713,601

[22] Filed: Jun. 11, 1991

Related U.S. Application Data

[63] Continuation of Ser. No. 564,270, Aug. 8, 1990, abandoned, which is a continuation-in-part of Ser. No. 280,902, Dec. 7, 1988, abandoned.

[30] Foreign Application Priority Data

Apr. 28, 1988 [JP] Japan ................. 63-106540

[51] Int. Cl.$^5$ ............... G02B 5/02; G02B 13/02
[52] U.S. Cl. ................. 359/625; 359/741; 354/200
[58] Field of Search .............. 350/167, 431, 451; 354/101, 200

[56] References Cited

U.S. PATENT DOCUMENTS

| | | | |
|---|---|---|---|
| 3,128,924 | 11/1965 | Miller | 350/167 |
| 4,071,292 | 1/1978 | Ise et al. | 350/128 |
| 4,421,398 | 12/1983 | Suzuki et al. | 354/200 |
| 4,427,265 | 1/1984 | Suzuki et al. | 350/167 |
| 4,567,123 | 1/1986 | Ohtaka et al. | 430/4 |
| 4,703,405 | 10/1987 | Lewin | 350/167 |

FOREIGN PATENT DOCUMENTS 3125205 3/1982 Fed. Rep. of Germany .
3125317 4/1982 Fed. Rep. of Germany .

OTHER PUBLICATIONS

"Investigation and Application of Photographic Micro-Lenticular Rasters", Deml et al. Optik 37 pp. 439–450, Sep. 1972.

Primary Examiner—Bruce Y. Arnold
Assistant Examiner—David R. Parsons
Attorney, Agent, or Firm—Sughrue, Mion, Zinn Macpeak & Seas

[57] ABSTRACT

A focusing screen for use in the finder system of a camera such as a single-lens reflex camera, and a method of forming a microstructure array suitable for use in the production of such a focusing screen. The focusing screen includes an optical material in plate form having on one surface a plurality of small lens portions that project in a regular array of equilateral triangles from the optical material and each of which has concentric contour lines, with a central apex. A flat portion is formed between adjacent small lens portions and a constricted portion is formed in the middle portion of the inclined surface of each small lens portion, with an irregular pattern of finer asperities is formed on the surfaces of the small lens portions and the flat portion. The high and low spots can be reversed. The method of forming a microstructure array includes the steps of forming a fine pattern of elements on a layer of light-sensitive material capable of transforming a distribution of light intensity to a surface relief by exposing the layer through a microlens array to rays of light with an intensity distribution corresponding to individual elements of the fine pattern. The microlens array may be replaced with a group of pinholes.

16 Claims, 18 Drawing Sheets

FOCUSING SCREEN

This is a continuation of application Ser. No. 07/564,270 filed on Aug. 8, 1990, now abandoned which is a continuation of application No. 07/280,902 filed Dec. 7, 1988, now abandoned.

BACKGROUND OF THE INVENTION

1. Field of the Invention

The present invention relates to a focusing screen for use in the finder system of a camera such as a single-lens reflex camera. The present invention also relates to a method of forming a microstructure array suitable for use in the production of such a focusing screen.

2. Description of the Prior Art

With a view to improving the ability of a finder system to detect a lack of sharpness during defocusing, by improving its diffusion characteristics while maintaining its brightness, various focusing screens have been proposed that have a fine regular pattern of high and low spots formed on a matted surface.

FIG. 34 shows an example of such conventional focusing screens. In this focusing screen, the surface of an optical material in plate form is provided with a pattern of regular hexagons that are in close contact with one another and each of which have a conical projection formed therein with the apex being positioned at the center of each hexagon. The distance between each apex is 20 μm and the angle of inclination with respect to the surface of the optical material is set at 10 degrees.

The characteristics of this focusing screen are as shown in FIG. 35 which is a spectrum diagram. The spectrum diagram shows by two-dimensional angular coordinates the diffusion of light that emerges from the focusing screen when a single beam of light falls on the screen in a direction normal to it. The intensity of spectrum is indicated by the size of a circle in the diagram.

The three quadrants in the diagram correspond to the wavelengths of R (637 nm), G (555 nm) and B (489 nm) as shown in FIG. 36. The wavelengths of the R and B components are set so that the luminosity of the R and B components is 20% of that of the G component.

As shown in FIG. 35, the G and B components of the first-order light have particularly weak spectra, producing subjectively unnatural blurring in defocusing. The apex of the projection in each hexagon is theoretically acute but in practice such a shape is difficult to attain by presently available machining techniques. Therefore, the variations in spectral intensity tend to be greater than theoretical values.

FIG. 37 shows another example of conventional focusing screens, which is also provided with a pattern of regular hexagons with the inter-apex distance of 17.2 μm and which has a generally spherical projection formed in each hexagon (the calculation of spectra is approximated by a stepped pattern as shown in FIG. 37). The characteristics of this focusing screen are as shown in FIG. 38. As in the previous case, the balance between the zero-order and first-order light is poor for all color components, producing unnatural blurring in defocusing.

Assume in this case that a reflex type telephotographic lens (mirror lens) having a large F number is attached to a single-lens reflex camera. As shown in FIG. 39, the exit pupil (E.P.) of the mirror lens is of annular shape, so the first-order light $L_1$ falls on the focusing screen (F.S.) but the zero-order light $L_0$ will not. Therefore, if the focusing screen used has such poor color balance that the balance of spectral intensity between the zero-order and first-order light is reversed with respect to the R and B components, an uneven color distribution will occur in the central portion of the finder when looked at by the viewer's eye E through an eyepiece lens E.L.

The technique disclosed in Unexamined Published Japanese Patent Application No. 41728/1982 is known as a method for forming a microstructure array of a type that can be employed in the focusing screens described above. The exposing process employed with the technique described in this patent application comprises the following steps. Placing a transmission chart on which a pattern is drawn, the elements of which are equal in number to those of the fine pattern to be formed on the layer of light-sensitive material, between a light source and a layer of light-sensitive material. Forming an image of the chart on the layer of light-sensitive material via an imaging lens, thereby producing a pattern of fine asperities in accordance with the intensity of light.

In this process, a pattern which contains as many elements as the fine pattern of asperities to be formed, must be formed on the transmission chart, and this inevitably adds to the complexity of the chart fabrication process. Furthermore, if one wants to modify the geometry of the pattern of asperities, he has to remake the whole pattern to be formed on the chart.

In the event that the distance between the layer of light-sensitive material and the transmission chart being placed between it and a light source varies, then variations would also result in the geometry of the pattern of asperities to be formed. Therefore, close tolerances are required when placing the chart between the light-sensitive layer and the light source.

A further problem occurs when a very complex pattern of asperities is to be formed on the layer of light-sensitive material, since in order to form a pattern of high and low spots which faithfully reflects the transmission characteristics of the pattern formed on the transmission chart, the distance between the light-sensitive layer and the chart must be set to a considerably small value during exposure. However, if this distance is reduced, interference fringes will occur between the light-sensitive layer and the chart, thereby making it impossible to obtain the desired regular pattern of asperities. If the resulting pattern is used with a focusing screen, partial unevennes in diffusion will inevitably occur.

SUMMARY OF THE INVENTION

An object of the present invention is to provide a method of forming a microstructure array that permits the use of a more convenient and easy-to-modify transmission chart and which also allows the chart to be set in a simpler way without producing interference fringes during exposure.

Another object of the present invention is to solve these problems of the prior art and to provide a focusing screen that is capable of producing natural blurring in defocusing by attaining a balance between the spectral intensities of zero-order light and higher orders of light, and which also offers a color balance between the R, G and B components to ensure that an uneven color distribution will not occur within the finder even when a special lens such as a mirror lens is employed.

As illustrated in FIGS. 1 and 2, the focusing screen of the present invention comprises an optical material in plate form 10 having on one surface a plurality of small lens portions 20 that project in a regular array of equilateral triangles from the optical material and each of which has concentric contour lines, with the apex 21 being positioned at its center. This focusing screen is further characterized in that a flat portion 30 that has neither high nor low spots is formed between adjacent small lens portions and a constricted portion 22 is formed in the middle portion of the inclined surface of each small lens portion which extends from its periphery to the apex. This constricted portion is less steep than the upper and lower portions of the inclined surface.

It is known in the art that the optical performance of a focusing screen provided with a regular pattern of high and low spots will not change even if the high spots are designed as low spots and the low spots as high spots. Based on this fact, an embodiment of the present invention is virtually the same as shown in FIG. 1, except that the high and low spots are reversed as shown in FIG. 3. The apexes of the high spots in FIG. 1 correspond to the valleys in FIG. 3 and the constricted portion 22 is replaced by a bulging portion 22'. However, there is no substantial difference in geometry from the embodiment shown in FIG. 1 except for the reversal of high and low spots.

The average angle of inclination $\theta$ of the inclined surface connecting the apex (or valley) of a small lens portion 20 shown in FIG. 1 and its periphery is specified with respect to the distance P between the apexes (or valleys) of adjacent small lens portions. Thus the focusing screen satisfies the following condition:

$$90 < (n-1).P.\theta < 130 \qquad (1)$$

where $\theta = \tan^{-1}(|H_{max}|/D)$.

In condition (1), n signifies the refractive index of an optical material; Hmax signifies the height (or depth) of the apex (or valley) with the direction of projection being taken as positive with respect to the flat portion; and D signifies the radius of a small lens portion.

The depth (or height) of the constricted portion 22 (or bulging portion 22') with respect to the overall profile of the inclined surface satisfies the following condition:

$$0.8 < |H_{0.2D}/H_{max}| < 1 \qquad (2)$$

$$0.4 < |H_{0.4D}/H_{max}| < 0.8 \qquad (3)$$

$$0.2 < |H_{0.6D}/H_{max}| < 0.6 \qquad (4)$$

$$0.1 < |H_{0.8D}/H_{max}| < 0.5 \qquad (5)$$

where Hmax signifies the height (or depth) of the apex (or valley) of a small lens portion with the direction of projection being taken as positive with respect to the flat portion; D signifies the radius of the small lens portion; and $H_{xD}$ signifies the height of a contour line having the radius xD with the direction of projection being taken as positive with respect to the flat portion (See FIG. 1).

The two-dimensional proportions of the small lens portion 20 and the flat portion 30, and the condition to be satisfied by the focusing screen are set forth as follows:

$$0.35 < D/P < 0.5 \qquad (6)$$

where P denotes the distance between the apexes (or valleys) of two adjacent small lens portions, and D signifies the radius of each small lens portion (see FIG. 2).

An irregular pattern of finer asperities is formed on the surfaces of the small lens portion and the flat portion as shown in FIG. 4.

The method of forming a microstructure array according to the present invention includes the steps of forming a fine pattern of elements on a layer of light-sensitive material capable of transforming a distribution of light intensity to a surface relief (a distribution of high and low spots) by exposing said layer of light-sensitive material through a microlens array to rays of light having an intensity distribution in association with individual elements of the fine pattern to be formed in accordance with the transformation characteristics of the layer of light-sensitive material. The microlens array may be replaced with a group of pinholes.

BRIEF DESCRIPTION OF THE DRAWINGS

FIGS. 9(a) to 14(b) show modifications of the first embodiment.

FIGS. 9(a) and 10(a) show modifications in which the average inclination of the inclined surface of a microlens portion is changed, in which 9(a) and 10(a) show diagrammatically the contours of individual microlens portions.

FIGS. 13(b) and 14(b) show spectrum diagrams corresponding to the individual contours;

show diagrammatically the contours of individual microlens portions, and

Figure 15A:
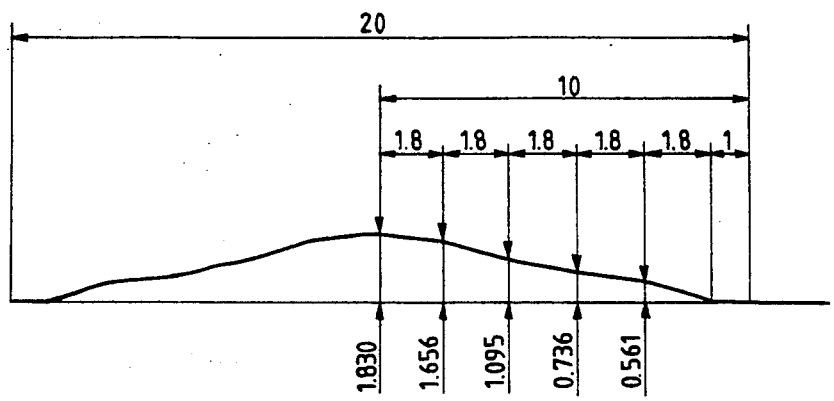
FIG. 15(a) shows an embodiment of the present invention where the inter-apex distance is increased as compared with the first embodiment.
Figure 15B:
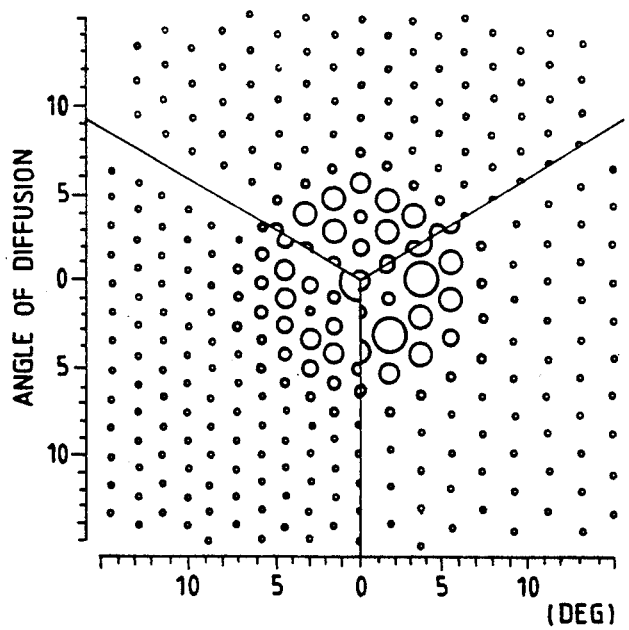
Figure 16A:
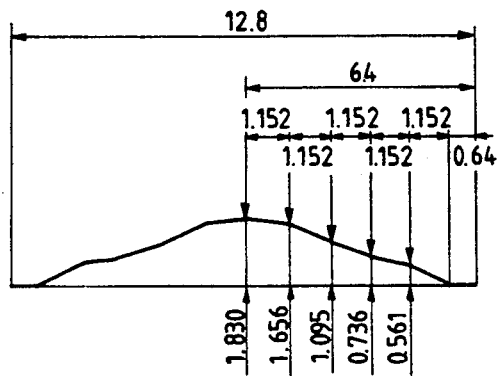
FIG. 16(a) shows an embodiment where the inter-apex distance is reduced, wherein FIGS. 15(a) and 16(a)
Figure 16B:
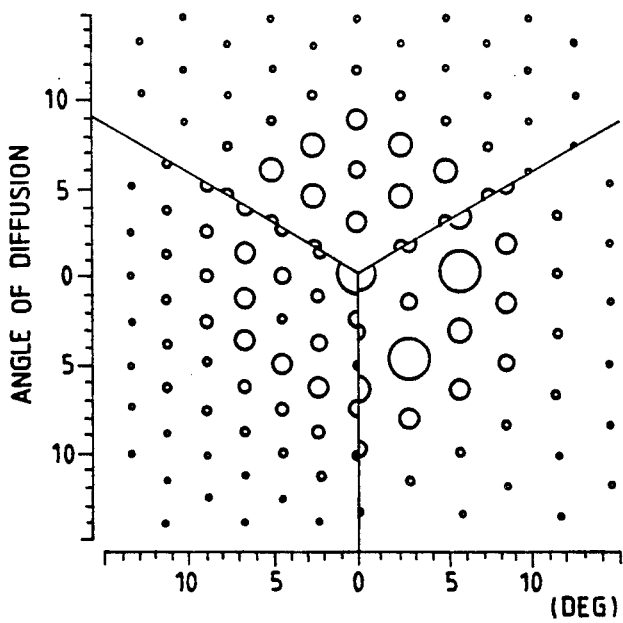

FIGS. 15(b) and 16(b) being spectrum diagrams corresponding to the individual contours.

Figure 17:
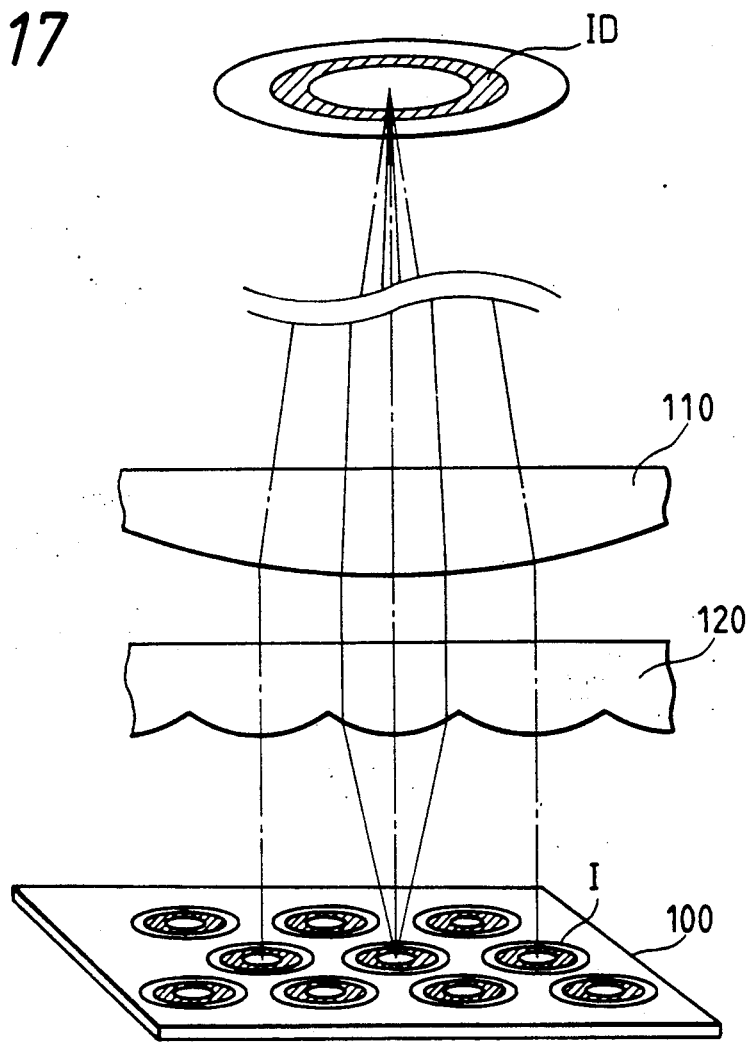
Figure 18:
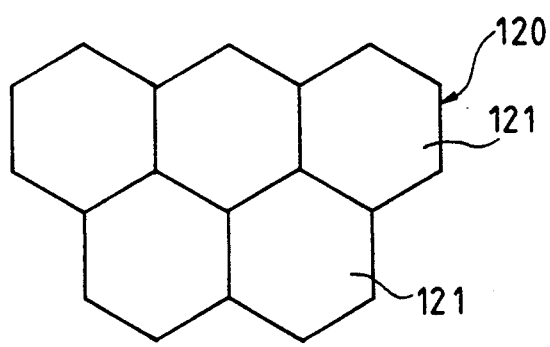
Figure 19:
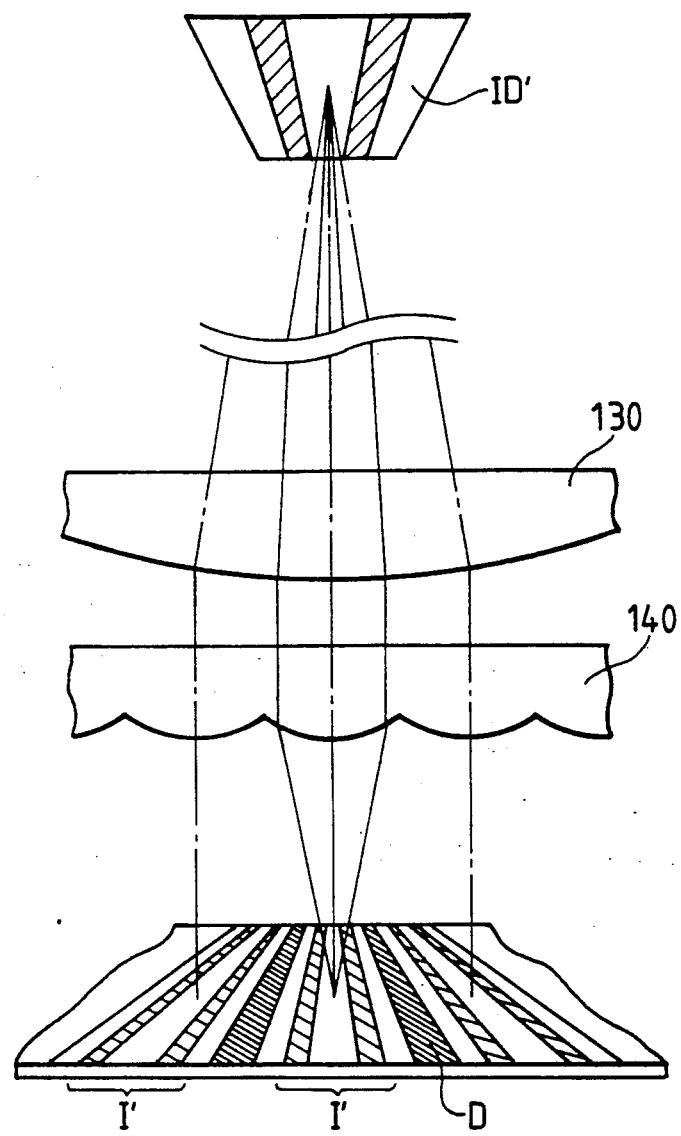
Figure 20:
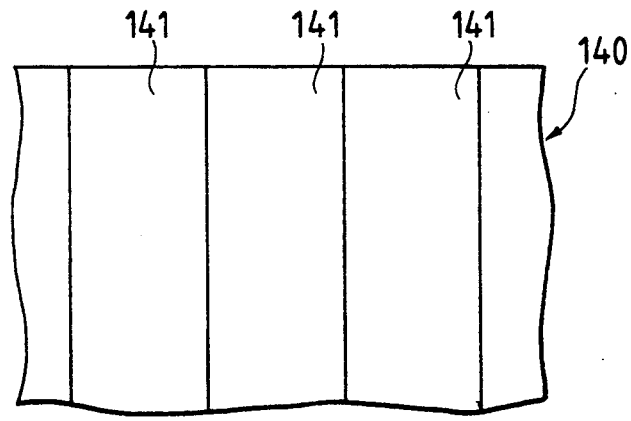
Figure 21:
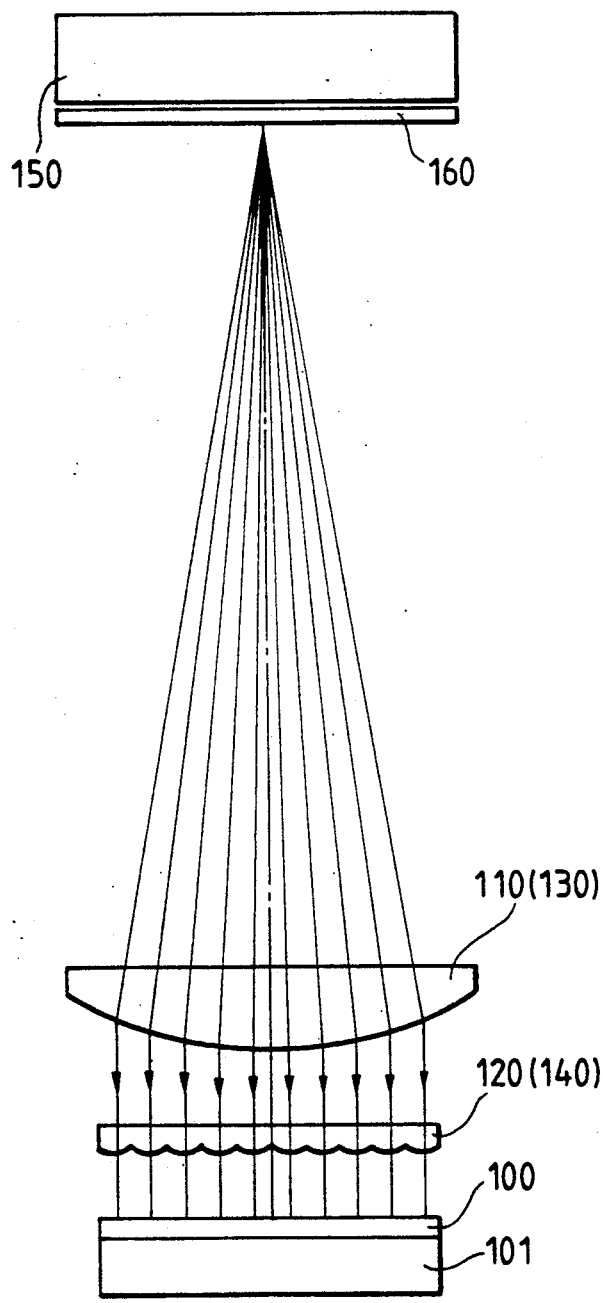
Figure 22:
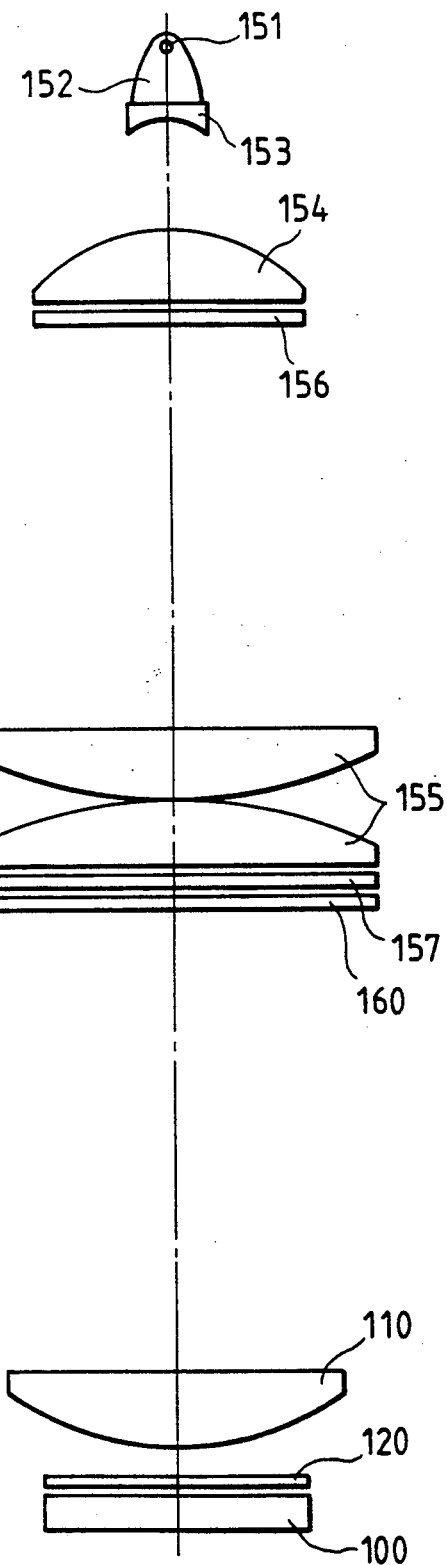
Figure 23:
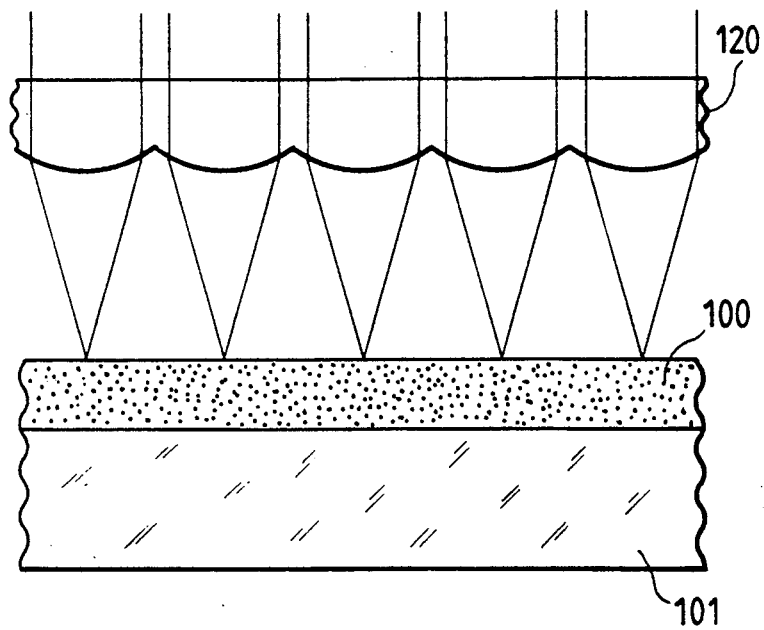
Figure 24:
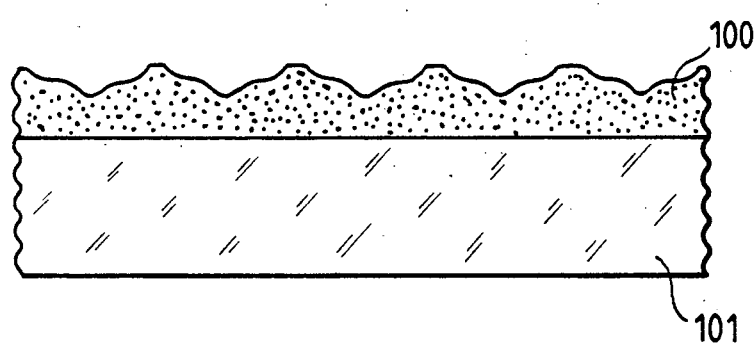
Figure 25:
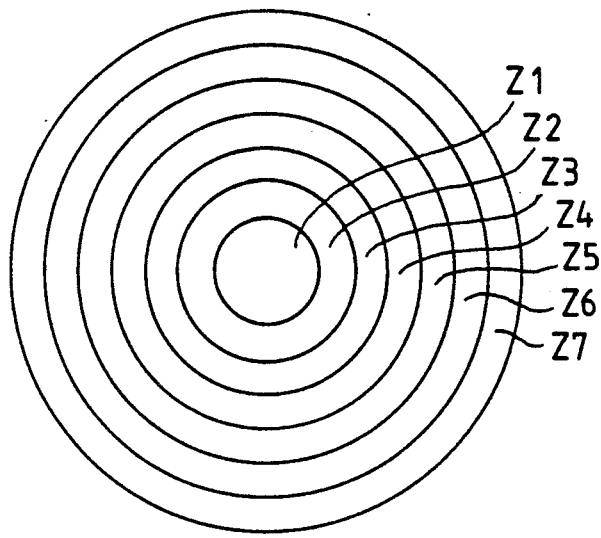
Figure 26:
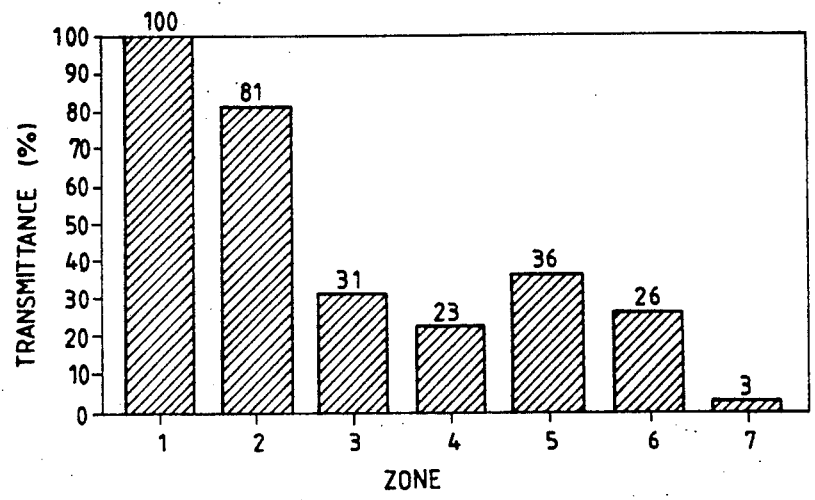
Figure 27:
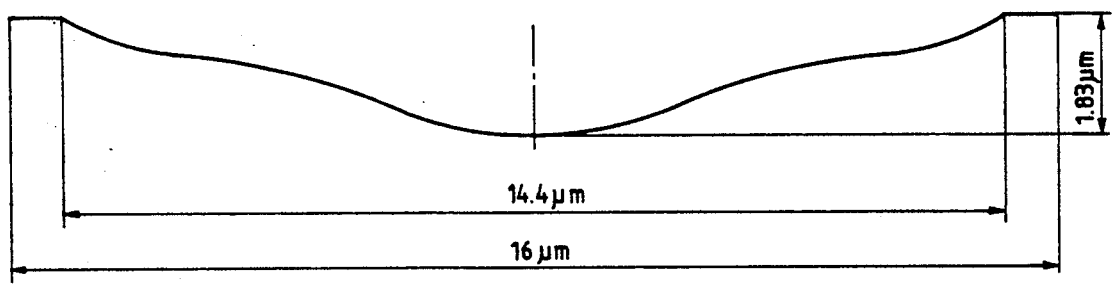
Figure 28:
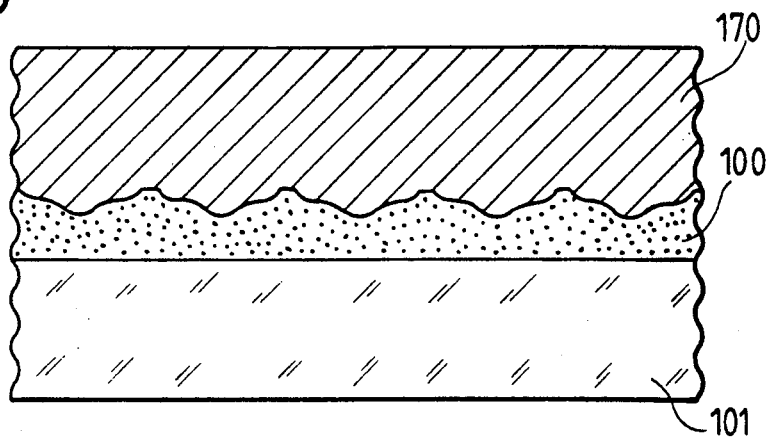
Figure 29:
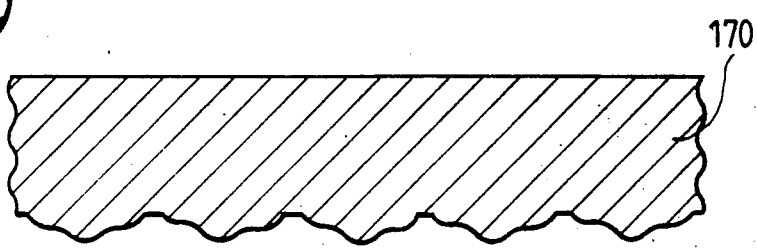
Figure 30:
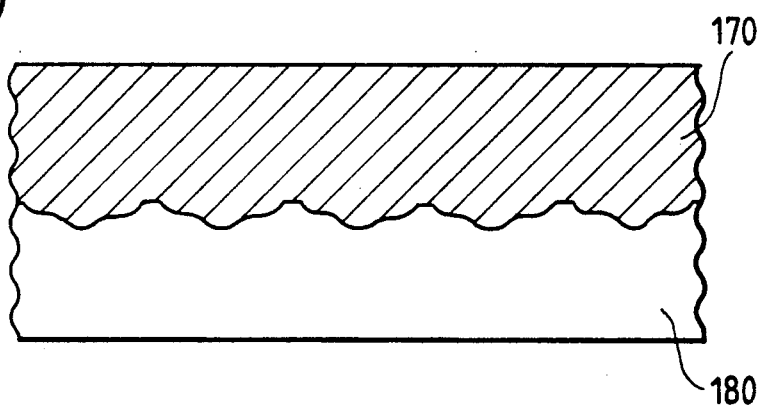

FIGS. 17 to 31 show methods of forming a microstructure array according to the present invention;

FIG. 17 shows an exposing apparatus used to form a two-dimensional pattern of high and low spots;

FIG. 18 is a plan view of the microlens array shown in FIG. 17;

FIG. 19 shows an exposing apparatus used to form a one-dimensional pattern of high and low spots;

FIG. 20 is a plan view of the microlens array shown in FIG. 19;

FIG. 21 shows the optical path of the exposing apparatus shown in FIGS. 17 and 19;

FIG. 22 shows specifically the composition of the exposing apparatus;

FIG. 23 shows how exposure is effected according to the present invention;

FIG. 24 depicts a layer of light-sensitive material on which a pattern of low and high spots has been formed by exposure;

FIG. 25 is a plan view showing an exemplary transmission chart;

FIG. 26 is a graph showing a specific transmittance profile of the chart shown in FIG. 25;

FIG. 27 shows the pattern of high and low spots formed with the chart shown in FIG. 26;

FIG. 28 illustrates an electroforming process;

FIG. 29 shows the formation of a mold by electroforming;

FIG. 30 shows the step of transferring the pattern on the mold; and

Figure 31:
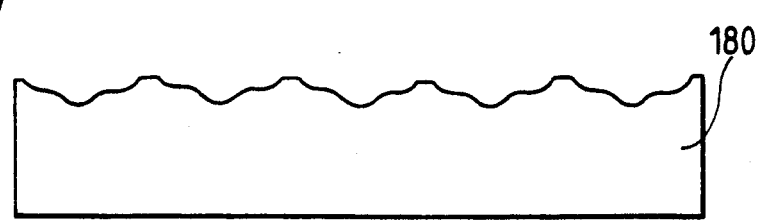

FIG. 31 depicts the microstructure array formed by the step of transfer.

Figure 32:
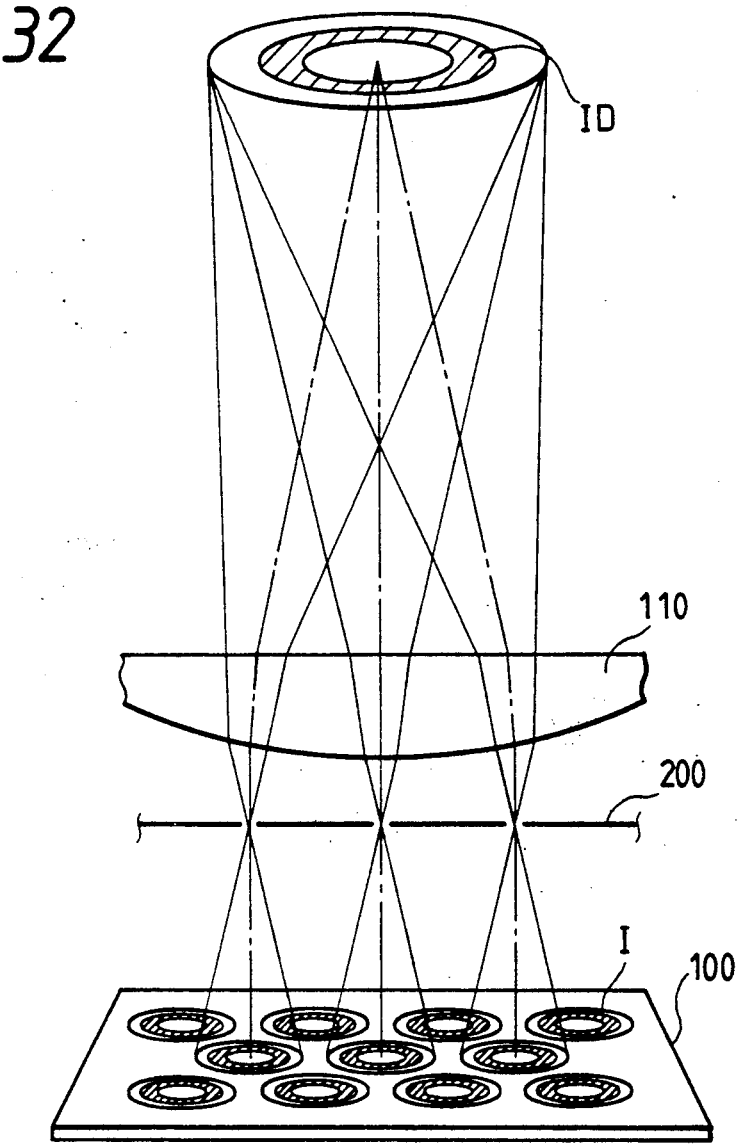
Figure 33:
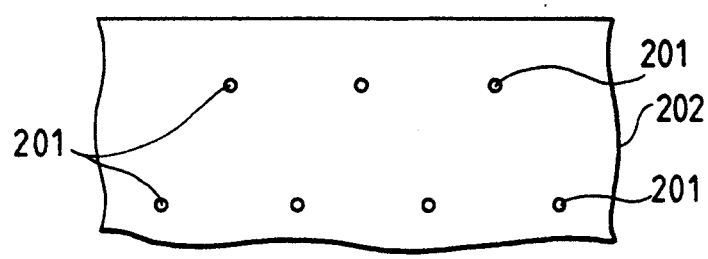

FIG. 32 shows the concept of an exposing apparatus used in a second method of forming a microstructure array;

FIG. 33 is a plan view of the group of pinholes shown in FIG. 32.

Figure 34:
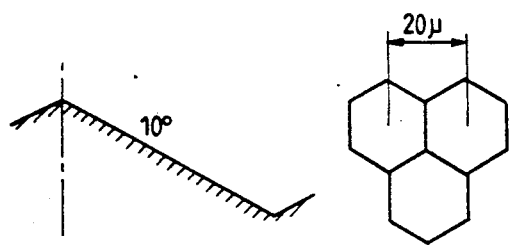
Figure 35:
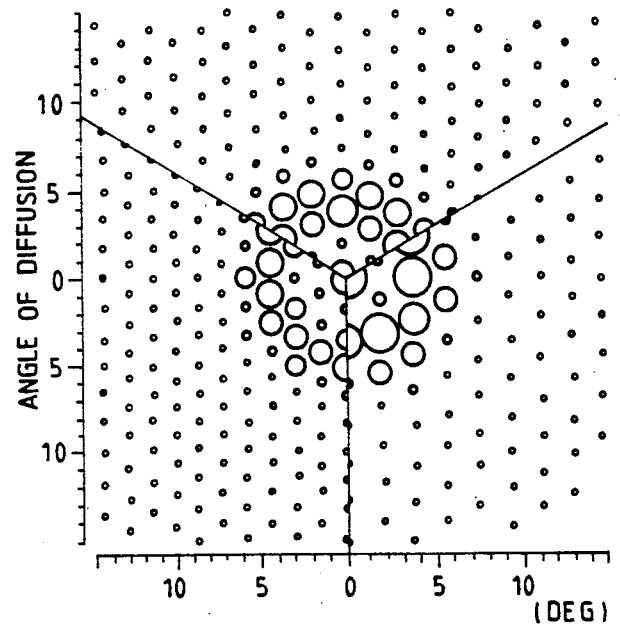
Figure 36:
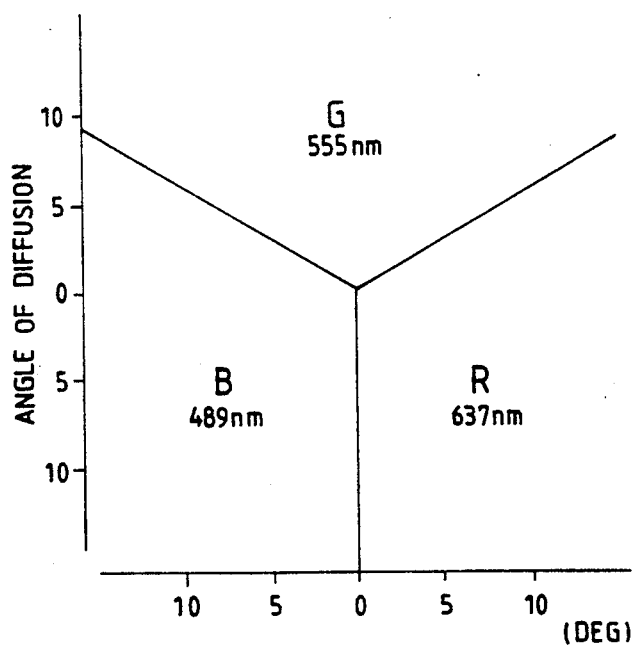
Figure 37:
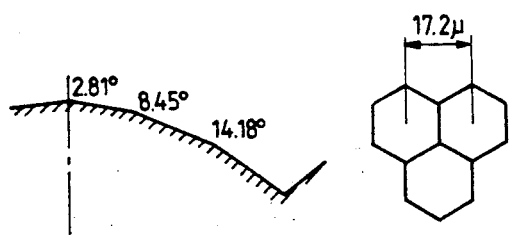
Figure 38:
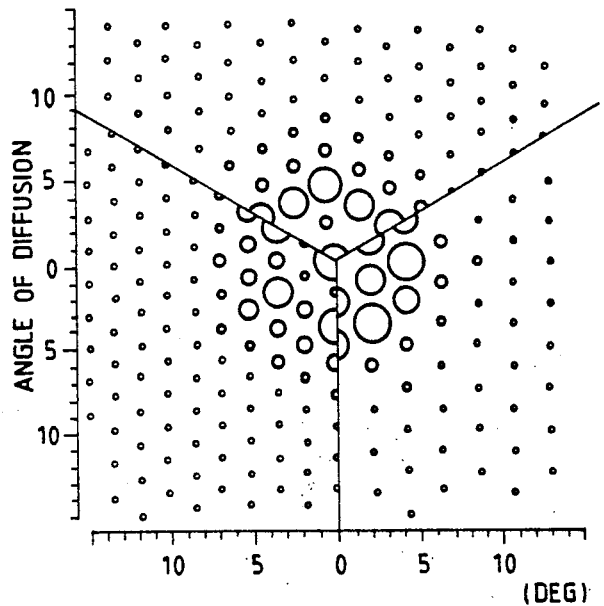

FIGS. 34 to 38 show conventional focusing screens;

FIG. 34 shows the composition of a fine pattern of cones;

FIG. 35 is a spectrum diagram obtained with the composition shown in FIG. 34;

FIG. 36 is an explanatory diagram for the spectrum diagram;

FIG. 37 shows the composition of a fine pattern of spheres;

FIG. 38 is a spectrum diagram obtained with the composition shown in FIG. 37.

Figure 39:
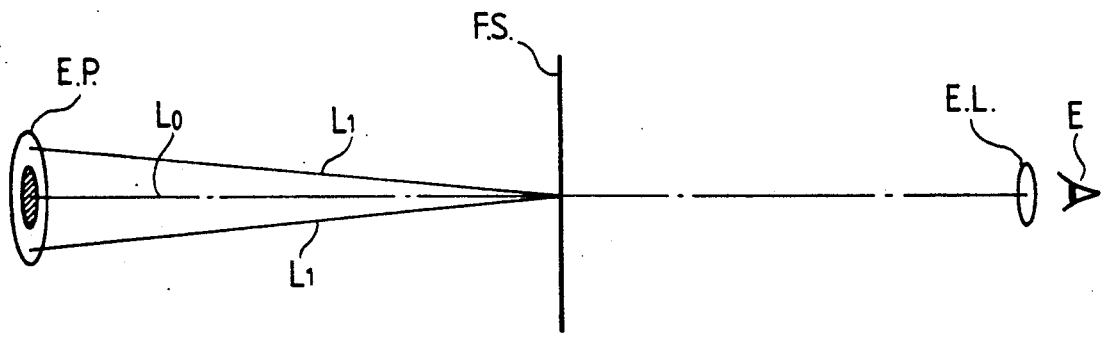

FIG. 39 shows diagrammatically the use of a mirror lens in a single-lens reflex camera.

DETAILED DESCRIPTION OF THE PREFERRED EMBODIMENTS

Embodiments for the focusing screen of the present invention are described hereinafter with reference to the accompanying drawings.

A focusing screen according to a preferred embodiment of the present invention is described below with reference to FIGS. 5–7.

Figure 5:
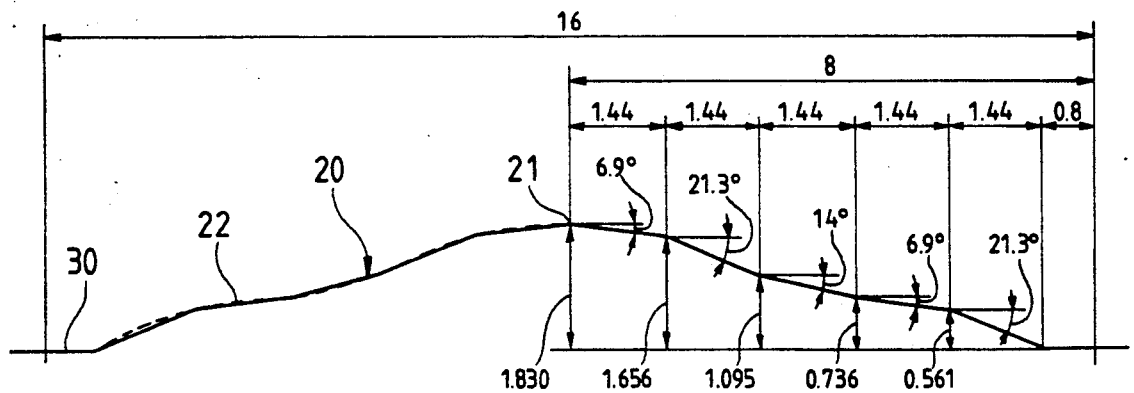
FIG. 5 is microlens portion of a focusing screen according to a first embodiment of the present invention.
Figure 6:
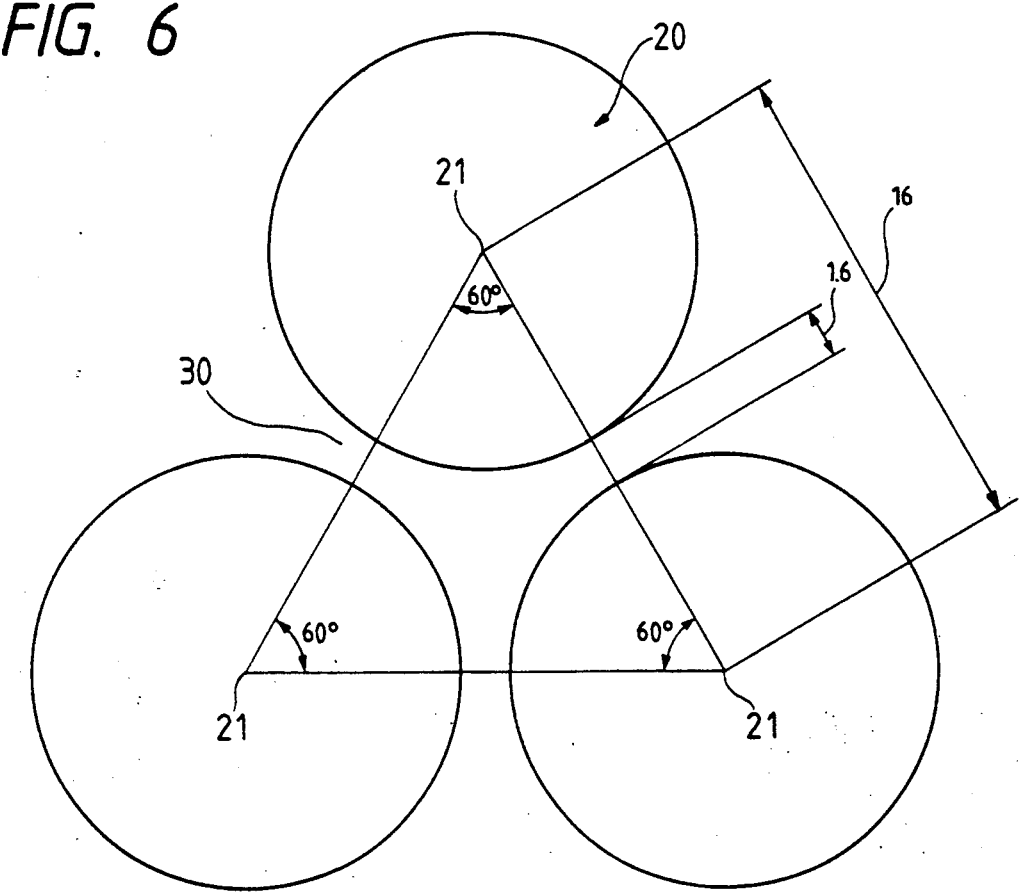
FIG. 6 is a plan view of three adjacent microlens portions of the type shown in FIG. 5.

FIG. 5 shows a cross-sectional structure of a microlens portion 20 formed as a projection in convex lens form on one surface of an optical material 10. The inclined surface of the lens portion 20 having concentric contour lines is formed in such a way that it is gradually elevated from a flat portion 30 to the apex 21.

In the example shown, the refractive index (n) of the optical material is 1.49136 and the height (Hmax) of the apex 21 is 1.83 μm where the direction of projection is positive with respect to the flat portion 30.

A plurality of the microlens portions 20 specified above are arranged in such a way that the apexes 21 of three adjacent lens portions 20 form an equilateral triangle, with the distance (P) between the apexes of adjacent lens portions being 16 μm and the radius (D) of each lens portions being 7.2 μm. Therefore, the angle of inclination ($\theta$) specified by condition (1) is 14.26° and the distance between contour lines specified by conditions (2) to (5) is 1.44 μm.

For calculation purposes, the microlens portion shown in FIG. 5 is shaped so that its cross section comprises a straight line connecting the individual contour lines. The angle to the flat portion 30 is indicated for the position of each contour line. If desired, the angular portions of the cross section may be eliminated to provide a smooth surface.

According to the composition described above, conditions (1) to (6) provide the following values:

$$(n-1).P.\theta = 112.11 \quad (1)$$

$$|H_{0.2D}/H\max| = 0.905 \quad (2)$$

$$|H_{0.4D}/H\max| = 0.598 \quad (3)$$

$$|H_{0.6D}/H\max| = 0.402 \quad (4)$$

$$|H_{0.8D}/H\max| = 0.307 \quad (5)$$

$$D/P = 0.45 \quad (6)$$

Figure 7:
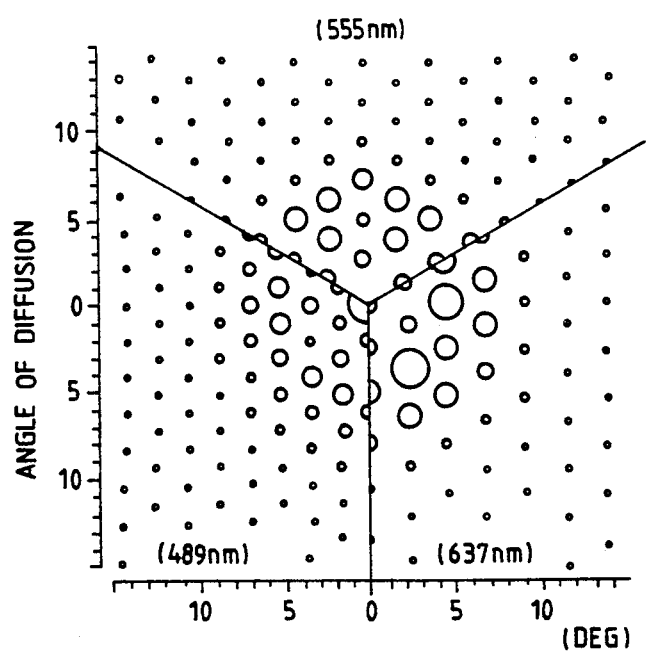
FIG. 7 is a spectrum diagram for the focusing screen shown in FIG. 6.

A focusing screen having the composition described above has spectrum characteristics as shown in FIG. 7. Compared with the conventional focusing screens, the screen according to the first embodiment of the present invention provides a uniform distribution of the intensities of light of no higher than third order for R, G and B components.

If an irregular pattern of fine asperities is formed on the surface of an individual microlens portion, the spectrum intensity of each order of light will spread to provide more natural blurring in defocusing. The size of the asperities to be formed is preferably about 0.3 μm so that they will not affect the basic geometry of the microlens portions.

Figure 8:
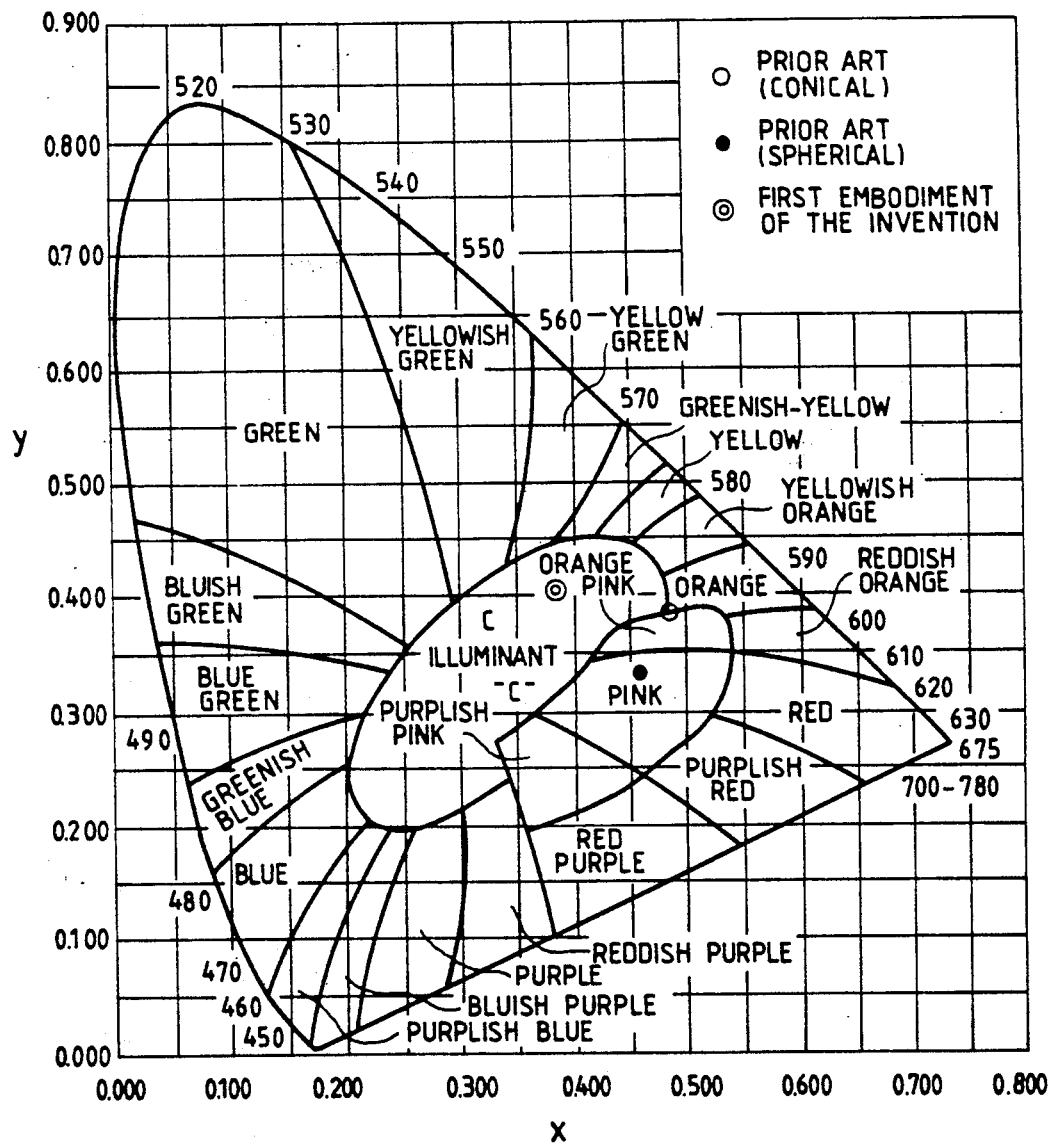
FIG. 8 is a chromaticity diagram comparing the spectrum of first-order light between the focusing screen of the first embodiment and a conventional focusing screen.

The color of the spectrum of the first-order light produced by the focusing screen according to the first embodiment of the present invention is as shown by a double circle in the chromaticity diagram of FIG. 8, from which one is able to see that this screen provides first-order light that is closer to white than the color produced by a conventional screen employing conical lens portions (as indicated by a circle) and another conventional screen using spherical lens portions (as indicated by a dot).

FIGS. 9(a) to 14(b) show modifications of the focusing screen of the first embodiment of the present invention in that the geometry of the microlens portion is changed subject to the conditions (1) to (6). FIGS. 9(a) to 14(a) shown cross sections of the modified focusing screens and FIGS. 9(b) to 14(b) show their spectrum characteristics.

First, assume the case where the average angle of inclination θ of the inclined surface 22 of the microlens portion 20 as specified by condition (1) is changed by adjusting the height of the apex Hmax and the distance between apexes P with the area of the flat portion 30 remaining the same. The results are shown in FIGS. 9(a) and 10(a).

Figure 9A:
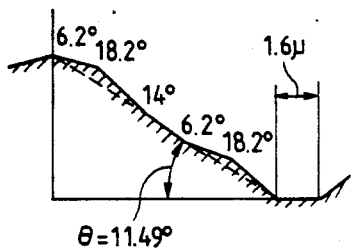

In the case shown in FIG. 9(a), Hmax=1.62 μm, P=16 μm and θ=12.68° which is smaller than θ=14.26° adopted in the first embodiment. Condition (1) provides the value (n−1).P.θ=99.69.

Figure 10A:
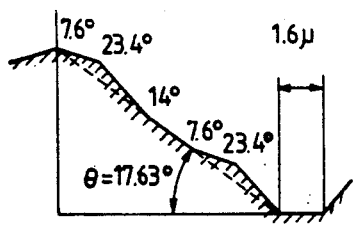

In the case shown in FIG. 10(a), Hmax=1.90 μm, P=16 μm and θ=15.45° which is greater than the value adopted in the first embodiment. In this case, condition (1) provides the value (n−1).P.θ=121.46.

Figure 9B:
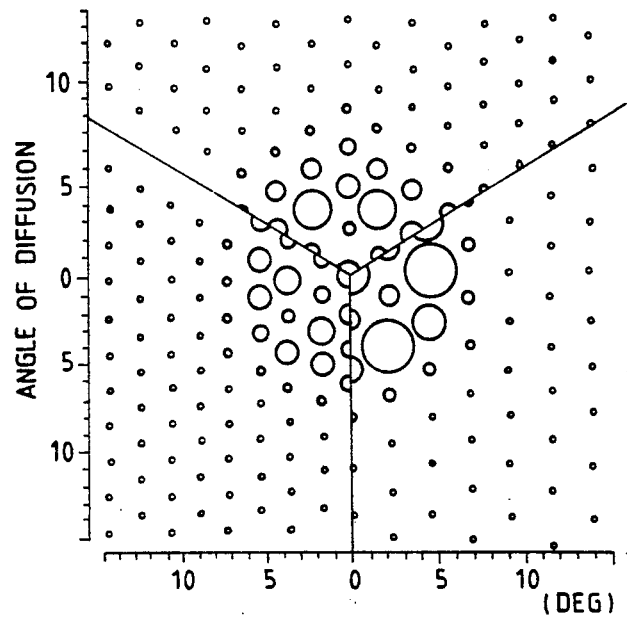
FIGS. 9(b) and 10(b) show spectrum diagrams corresponding to the individual contours.
Figure 10B:
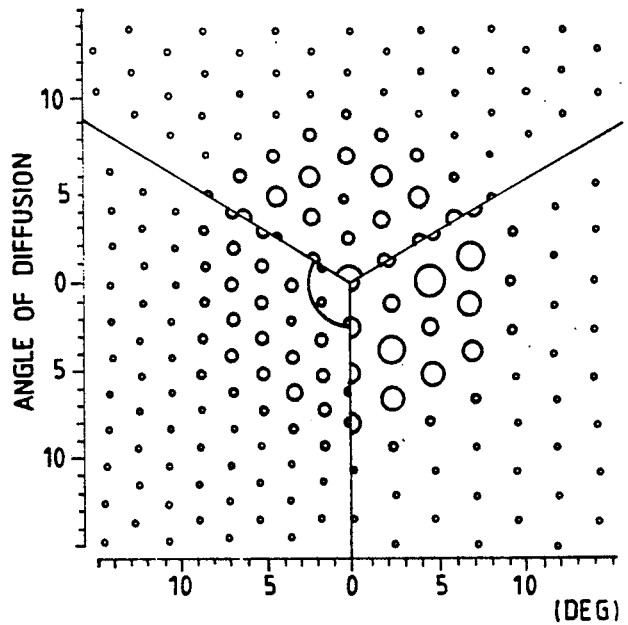

The spectral characteristics of the two cases are as shown in FIGS. 9(b) and 10(b). Since condition (1) is satisfied by both cases, there is no deterioration in the balance of light intensity for individual colors or its diffusion characteristics although some difference exists in the overall spectral intensity.

Secondly, assume the case where the depth of the constricted portion 22a as specified by conditions (2) to (5) with respect to the overall shape of the inclined surface is changed with the area of the flat portion and the height of apex (Hmax) remaining the same. The results are shown in FIGS. 11(a) and 12(a).

Figure 11A:
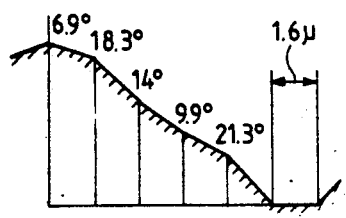
FIGS. 11(a) and 12(a) show a modification in which the depth of the constricted portion of the microlens portion is changed, in which 11(a) and 12(a) show diagrammatically the contours of individual microlens portions.
Figure 12A:
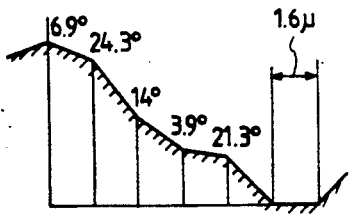
Figure 12B:
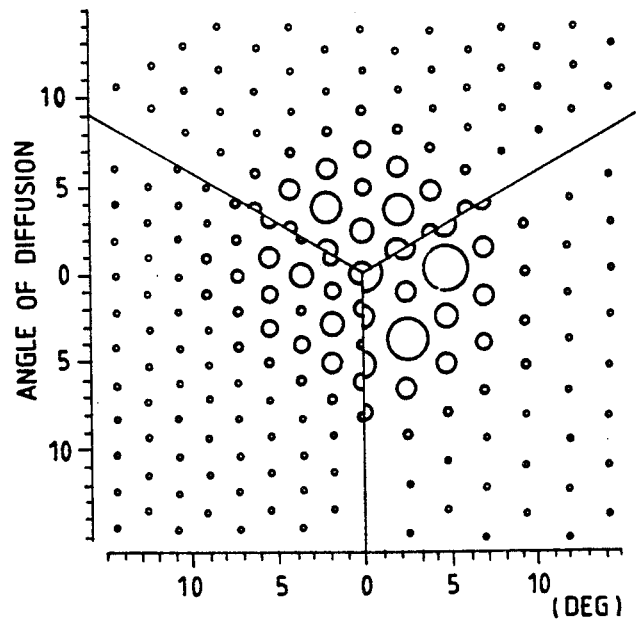

In the case shown in FIG. 11(a), the depth of the constricted portion is made smaller than in the first embodiment by adopting the following values:

$$|H_{0.2D}/Hmax| = 0.904 \quad (2)$$

$$|H_{0.4D}/Hmax| = 0.643 \quad (3)$$

$$|H_{0.6D}/Hmax| = 0.446 \quad (4)$$

$$|H_{0.8D}/Hmax| = 0.308 \quad (5)$$

In the case shown in FIG. 12(a), the depth of the constricted portion is made larger, rather than smaller, than in the first embodiment by adopting the following values:

$$|H_{0.2D}/Hmax| = 0.904 \quad (2)$$

$$|H_{0.4D}/Hmax| = 0.552 \quad (3)$$

$$|H_{0.6D}/Hmax| = 0.358 \quad (4)$$

$$|H_{0.8D}/Hmax| = 0.305 \quad (5)$$

Figure 1:
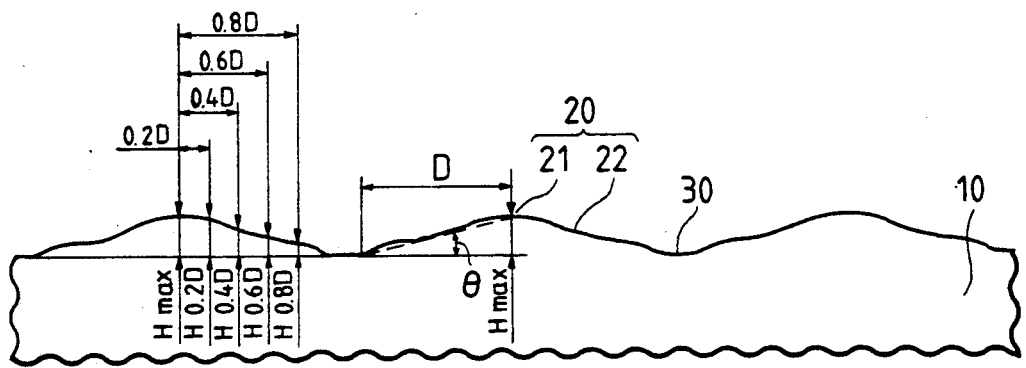
FIG. 1 is a cross section taken of line I—I of FIG. 2.
Figure 2:
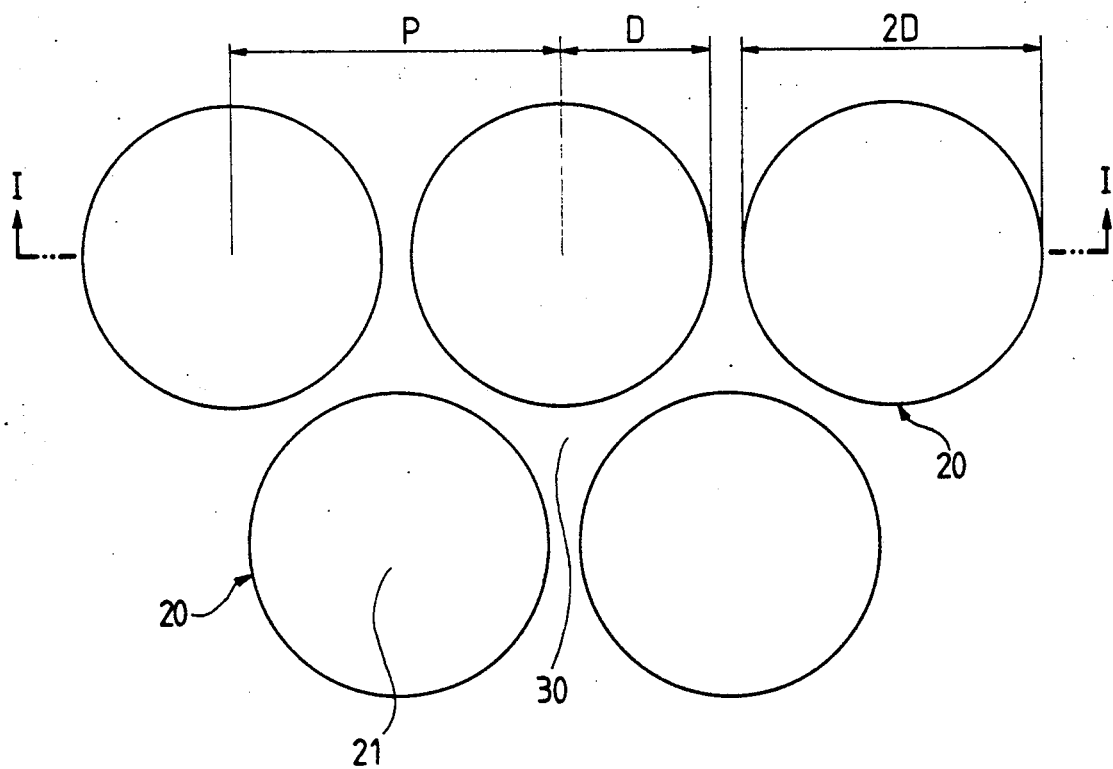
FIG. 2 shows is a plan view of a focusing screen in accordance with the present invention.
Figure 11B:
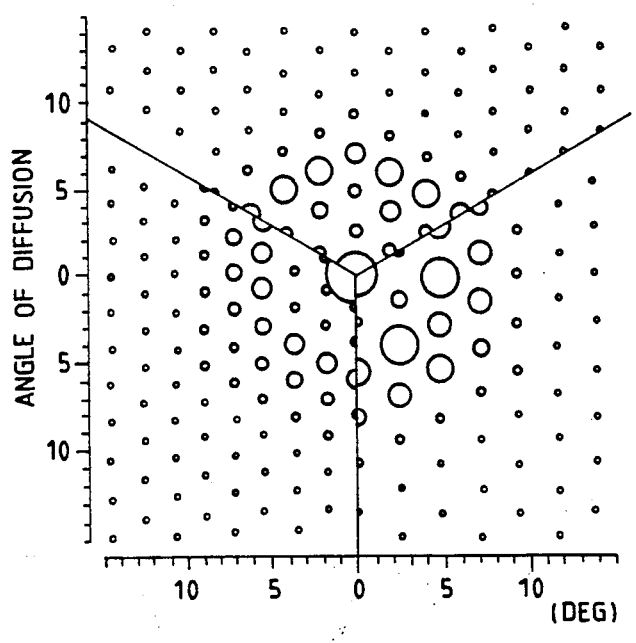
FIGS. 11(b) and 12(b) show spectrum diagrams corresponding to the individual contours.

As one can see from the spectrum characteristics shown in FIGS. 11(b) and 2(b), the zero-order light tends to be stronger in the former case than in the latter but the overall balance between the spectra of individual orders of light is more uniform in both cases than in the prior art system.

Thirdly, assume the case where the two-dimensional proportions of the microlens portion 20 and the flat portion 30 as specified by condition (6) are changed with the inter-apex distance P while the shape of the inclined surface 22 remains the same. The results are shown in FIGS. 13(a) and 14(a).

Figure 13A:
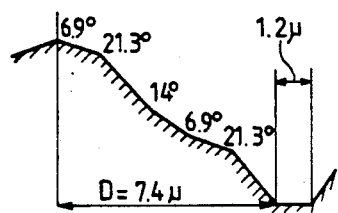
FIGS. 13(a) and 14(a) show a modification in which the proportion taken by the flat portion of the microlens portion is changed, in which 13(a) and 14(a) show diagrammatically the contours of individual microlens portions.
Figure 13B:
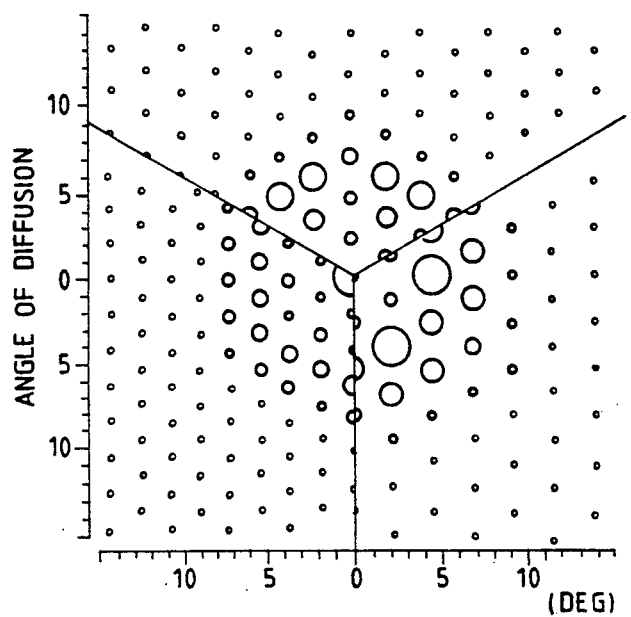

In the case shown in FIG. 13(a), the proportion taken by the flat portion 30 is reduced by increasing the radius (D) of the microlens portion to 7.4 μm which is 0.2 μm greater than the value adopted in the first embodiment. In this case, condition (6) provides D/P=0.4625.

Figure 14A:
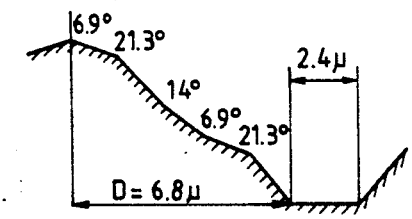
Figure 14B:
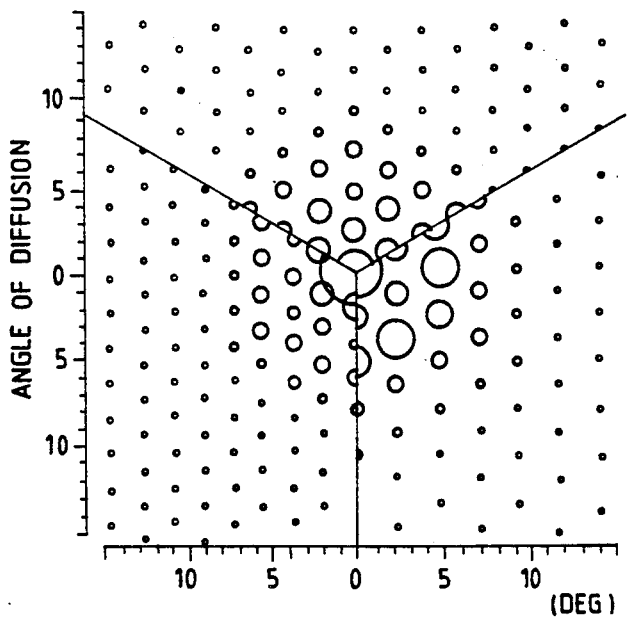

In the case shown in FIG. 14(a), the proportion taken by the flat portion 30 is made larger than in the first embodiment by adopting D=6.8 μm. In this case, condition (6) provides D/P=0.425.

Spectrum characteristics that are satisfactory for practical purposes can be attained if condition (6) is met. As one can see from FIGS. 13(b) and 14(b), the proportion of the flat portion 30 which is not employed in the prior art systems cause substantial effects on the spectral characteristics.

Described below is a second embodiment of the present invention in which the inter-apex distances P of the focusing screen is changed with the apex height Hmax, while the values for satisfying conditions (2) to (6) remain the same as in the first embodiment.

First, assume the case where the inter-apex distance P is increased by a factor of 1.25 to 20 μm as shown in FIG. 15(a). Since the height of apex Hmax is 1.83 μm which is the same as in the first embodiment, the height of individual contour lines is also the same as shown in FIG. 5. It should, however, be noted that the average inclination θ is 11.49° and that the value of (n−1).P.θ taken to satisfy condition (1) is 112.91. The distance between contour lines which are spaced at a pitch 0.2 times the radius D is 1.8 μm.

A focusing screen having the composition described above has spectrum characteristics as shown in FIG. 15(b) which is the same as FIG. 7 showing the spectral intensities of various orders of light obtained in the first embodiment except that the overall distribution of the positions of spectra is reduced in scale.

Secondly, assume the case where the inter-apex distance P is reduced to 12.8 μm which is smaller than the value adopted in the first embodiment by a factor of 0.8, as shown in FIG. 16(a). The heights of apex and each contour line are the same as those shown in FIG. 5. The average inclination θ is 17.625°, the value of (n−1).P.θ taken to satisfy condition (1) is 110.85, and the distance between contour lines spaced at a pitch 0.2 times the radius D is 1.152 μm.

A focusing screen having the composition described above has spectrum characteristics as shown in FIG. 16(b) which is the same as FIG. 7 showing the spectral intensities of various orders of light obtained in the first embodiment except that the overall distribution of the positions of spectra is enlarged.

The foregoing description shows that by properly selecting the inter-apex distance P without changing the values taken to satisfy conditions (2) to (6), the diffusion characteristics of light obtained can be freely controlled without causing any change in the blurring or color balance that is determined by the spectral intensities of various orders of light.

If one wants to obtain a microstructure array having a plurality of planar circular microlens portions arranged in a regular pattern as in the focusing screens described previously, a layer of light-sensitive material 100, such as a photoresist that transforms an intensity distribution of light to a surface relief, is exposed, through a telecentric lens 110 and a microlens array 120, to rays of light having a concentric intensity distribution ID that is associated with individual elements of the fine pattern to be obtained, or individual microlens portions of a focusing screen, in accordance with the transformation characteristics of the layer of light-sensitive material 100, as shown in FIG. 17.

In order to make efficient use of light by reducing leakage, the microlens array 120 is desirably composed of microlenses that are packed closely, as shown in FIG. 18.

By adopting the arrangement described above, rays of light transmitted into the microlens array 120 form a number of images I that have a desired intensity distribution for the individual lens elements 121 of the array on the light-sensitive layer 100. No light reaches the boundaries between individual images I.

Since the layer of light-sensitive material 100 transforms the amount of exposure to a surface relief, a desired microstructure array can be produced according to the exposing step described above.

Instead of forming a two-dimensional array as is done for a focusing screen, a structure comprising a fine one-dimensional striped pattern similar to a diffraction grating may be formed, as shown in FIG. 19.

In FIG. 19, a lenticular lens 140 formed of an assembly of microcylindrical lens elements 141, as shown in FIG. 20, is used as a microlens array.

Rays of light having an intensity distribution ID' associated with individual elements of the striped pattern to be obtained are passed through a cylindrical telecentric lens 130 and the lenticular lens 140 to form striped images I' on the light-sensitive layer 100. The areas between images I' are dark areas D since no light reaches there.

Whichever method is employed, rays of light having the desired intensity distribution can be obtained by combining a plane light source 150 with a transmission chart 160 having a predetermined transmission pattern as shown in FIG. 21. As shown in FIG. 21 the transmission chart 160 is disposed at the focal point of the telecentric lens 110 (or 130) in a direction where the lens has a refractive power, and this is effective for the purpose of preventing deterioration of the image formed by off-axis microlens elements.

Numeral 101 in FIG. 21 denotes a substrate having a coating of the light-sensitive layer 100.

A composition of an exposing apparatus employing the array structure shown in FIG. 18 is explained below in connection with the first aspect of the invention (i.e., a focusing screen).

As shown in FIG. 22, the optical system of the exposing apparatus comprises a lamp 151, a reflector mirror 152 for collimating the rays of light issuing from the lamp 151, a diffusing concave lens 153 for diffusing the collimated light to a predetermined spread, as well as first and second collimator lenses 154 and 155, and a first and a second diffusing plate 156 and 157 for uniformly illuminating a transmission chart 160. These elements are equivalent to the plane light source 150 shown in FIG. 21. Following these elements, the transmission chart 160, telecentric lens 110, microlens array 120 and the layer of light-sensitive material 100 are arranged in this order along an optical path as shown in FIG. 21.

If a positive-acting photoresist is to be used as the light-sensitive layer 100, it is desirably to use a xenon lamp as the lamp 151.

According to the composition described above, rays of light issuing from the lamp 151 illuminate the transmission chart 160 over its entire surface by the action of the collimator lenses and diffusing plates. The rays passing through the transmission chart 160 are guided by the telecentric lens 110 to fall on all of the microlens elements 121 in a normal direction as shown in FIG. 23, thereby forming images on the light-sensitive layer 100 that are equal in number to the microlens elements and which have an intensity distribution associated with the pattern on the transmission chart 160. By performing exposure for a predetermined period of time, a microstructure array having a number of high and low spots having a pattern in accordance with the intensity distribution can be obtained.

Figure 3:
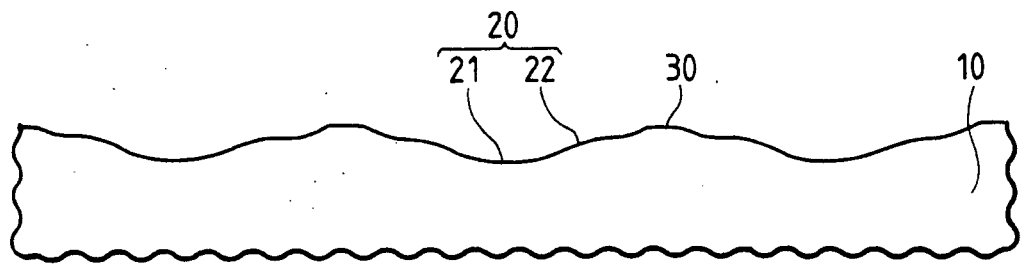
FIG. 3 is a cross section of a focusing screen in accordance with the present invention, taken in a similar way to FIG. 1.
Figure 4:
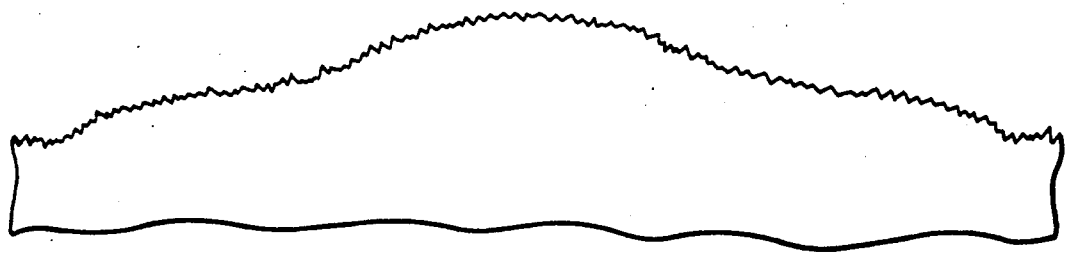
FIG. 4 is a cross section of a focusing screen in accordance with the present invention, taken in a similar way of FIG. 1.

If the layer of light-sensitive material 100 is positive-acting as in the case of a photoresist and if concentric zones are formed on the transmission chart 160 whose transmittance decreases from the center outward, a microstructure of the same type as the focusing screen shown in FIG. 3 can be formed. This microstructure comprises a number of concave microlens portions 20 and flat portions 30 positioned therebetween as shown in FIG. 24.

Stated more specifically, by forming concentric zones Z1 to Z7 on the transmission chart 160 having a diameter of 90 mm as shown in FIG. 25, with the respective zones having different transmittances as shown in FIG. 26, a number of concave reliefs having the profile shown in FIG. 27 can be formed. The profile of these reliefs is the same as the configuration of the focusing screen shown in FIG. 5 in accordance with the first embodiment of the present invention except that the high spots on that screen are made low and the low spots are made high, thereby satisfying the following specifications:

depth of valley: $H_{max} = -1.83$ μm diameter of microlens portion $2D = 14.4$ μm distance between valleys: $P = 16$ μm.

In the production of the reliefs described above, the distance between the transmission chart 160 and the microlens array 120 was set to 200 mm. Each of the lens elements of the microlens array 120 had a radius of curvature of 26 μm, a refractive index of 1.71 and a focal length of 36.62 μm, and the distance between the microlens array 120 and the layer of light-sensitive material was set to 32 μm in consideration of spherical aberration.

If a pattern of high and low spots to be produced consists of elements that are in contact with one another as in the conventional focusing screens, it is difficult to form clear boundaries between high and low spots, and as a result, the above-described method is not suitable where close tolerances are required. However, if regions that are not to be exposed exist between individual elements of the pattern of high and low spots, they can be formed completely independent of one another while ensuring high dimensional precision. In such a case, the method described above can be applied advantageously. For this reason, the method of forming a microstructure array according to the present invention is suitable for the purpose of forming the already-described focusing screen.

The exposing procedure described above is capable of forming a reasonably satisfactory microstructure array. However, the layer of light-sensitive material itself is highly prone to deterioration. Therefore, in order to be useful in practical applications the pattern formed on this light-sensitive layer has to be transferred to another material or an acrylic resin in the case of a focusing screen.

To meet this requirement, the surface of the light-sensitive layer 100 prepared by the exposing step is plated with an electroconductive material such as nickel or silver and is thereafter subjected to electroforming so as to reproduce the surface relief on the light-sensitive layer in a mold 170 as shown in FIG. 28. FIG. 29 shows a mold from which the layer of light-sensitive material 100 and the substrate 101 have been removed after electroforming.

In the next step, the fine pattern on the surface of the mold 170 is transferred to a suitable material such as an acrylic resin 180 as shown in FIG. 30. As a result, a microstructure array having the same profile as that of the surface of the light-sensitive layer 100 can be obtained as shown in FIG. 31.

The above described case refers to the use of a positive-acting light-sensitive material for forming a pattern of concave areas. It should, however, be noted that a pattern of convex areas can be formed by repeating the same procedures with a negative-acting light-sensitive material.

FIG. 32 shows a method of forming a microstructure array in accordance with another embodiment. This embodiment differs from the previous embodiment in that a group of pinholes 200 is used instead of the microlens array. Pinholes 201 are arranged in a regular right triangular array on a sheet material 202. Other constituent elements of the present embodiment are the same as those employed in the previous embodiment and need not be explained in detail since they are identified by like numerals.

If a group of pinholes 200 is used, a longer time is required to complete the exposing step under the same conditions as those employed in the previous embodiment, but the surface relief formed is basically the same as what is obtained when the microlens array is used.

As previously described, the focusing screen according to the first aspect of the present invention comprises a plurality of microlens portions having a flat portion formed therebetween. In addition, each of the microlens portions has a shape that has no angular portion. Therefore, a lens geometry that satisfies specific design requirements can be obtained with relative ease and the focusing screen produced ensures consistent performance without causing graininess that would otherwise occur if the shape of individual microlens portions were uneven.

If the conditions specified herein are satisfied, the intensities of spectra of no higher than third-order light can be held uniform for the three primary colors, thereby producing natural blurring in defocusing. As a further advantage, a special lens such as a mirror lens that has a large F number can be used in a single-lens reflex camera without causing substantial color imbalance.

The blurring which occurs in defocusing can be made to seem more natural by forming finer asperities on the surface of the microlens array.

The method of forming a microstructure array according to the second aspect of the present invention is based on the idea of forming a number of images by passing through a microlens array those rays of light which have an intensity distribution associated with individual elements of a fine pattern to be obtained. This offers the advantage that if a transmission chart is to be employed, only a single pattern needs to be formed on the chart that corresponds to each of the elements of the fine pattern to be produced, thereby making it easy to form or modify a transmission chart as compared with a conventional methods.

In addition, the method of the present invention enables the formation of a larger pattern than conventional methods, thereby providing greater flexibility in setting the intensity distribution of light rays. As a result, even an intricate pattern of fine asperities that has been difficult to form on account of limitations on the manufacturing practice can be formed with ease.

In a laboratory experiment, control of a shape smaller than 0.1 μm could be accomplished.

What is claimed is:

1. A focusing screen made from a plate of optical material, comprising:
   a plurality of small lens portions disposed on a surface of said plate, said plurality of small lens portions projecting from said surface in an array of equilateral triangles; and
   a flat portion formed around a periphery of each of said small lens portions;
   wherein each of said plurality of small lens portions has an inclined surface extending from said periphery of said small lens portion to an apex thereof, said inclined surface having a constricted portion.

2. A focusing screen as recited in claim 1, each of said small lens portions having concentric contour lines and an apex located at the center of said lens portion.

3. A focusing screen as recited in claim 2, wherein said focusing screen satisfies the following condition:

$$90 < (n-1).P\theta < 130$$

where $\theta = \tan^{-1}(H_{max}/D)$, in which n is the refractive index of said optical material, P is the distance between said apexes of adjacent ones of said small lens portions, Hmax is the height of said apexes, wherein the direction of projection is positive with respect to said flat portion, and D is the radius of said small lens portions.

4. A focusing screen as recited in claim 2, wherein said focusing screen satisfies the following condition:

$$0.8 < H_{0.2D}/H_{max} < 1$$

$$0.4 < H_{0.4D}/H_{max} < 0.8$$

$$0.2 < H_{0.6D}/H_{max} < 0.6$$

$$0.1 < H_{0.8D}/H_{max} < 0.5$$

where Hmax is the height of said apexes of said small lens portions, wherein the direction of projection is positive with respect to said flat portion, and D is the radius of said small lens portions, and $H_{0.2D}$, $H_{0.4D}$, $H_{0.6D}$, and $H_{0.8D}$ are the heights of contour lines having radii 0.2 D, 0.4 D, 0.6 D, and 0.8 D, respectively.

5. A focusing screen as recited in claim 2, wherein said focusing screen satisfies the following condition:

$$0.35 < D/P < 0.5$$

where P is the distance between said apexes of adjacent ones of said small lens portions, and D is the radius of said small lens portions.

6. A focusing screen as recited in claim 1, wherein said flat portion is formed so as to be devoid of high spots and low spots.

7. A focusing screen as recited in claim 1, wherein said constricted portion is disposed in a middle portion of said inclined surface between an upper and lower portion, said constricted portion having a less steep inclination than said upper and lower portions of said inclined surface.

8. A focusing screen as recited in claim 1, wherein each of said plurality of small lens portions and said flat portion has an irregular pattern of finer asperities formed thereon.

9. A focusing screen made from a plate of optical material, comprising:
- a plurality of small lens portions disposed on a surface of said plate, said plurality of small lens portions being recessed into said surface in an array of equilateral triangles; and
- a flat portion formed around a periphery of each of said small lens portions;
- wherein each of said plurality of small lens portions has an inclined surface extending from said periphery of said small lens portion to a valley thereof, said inclined surface having a bulging portion.

10. A focusing screen as recited in claim 9, each of said small lens portions having concentric contour lines and a valley located at the center of said small lens portion.

11. A focusing screen as recited in claim 10, wherein said focusing screen satisfies the following condition:

$$90 < (n-1).P\theta < 130$$

where $\theta = \tan^{-1}(Hmax/D)$, in which n is the refractive index of said optical material, P is the distance between said valleys of adjacent ones of said small lens portions, Hmax is the depth of said valleys, wherein the direction of projection is positive with respect to said flat portion, and D is the radius of said small lens portions.

12. A focusing screen as recited in claim 10, wherein said focusing screen satisfies the following condition:

$$0.8 < H_{0.2D}/Hmax < 1$$
$$0.4 < H_{0.4D}/Hmax < 0.8$$
$$0.2 < H_{0.6D}/Hmax < 0.6$$
$$0.1 < H_{0.8D}/Hmax < 0.5$$

where Hmax is the depth of said valleys of said small lens portions, wherein the direction of projection is positive with respect to said flat portion, and D is the radius of said small lens portions, and $H_{0.2D}$, $H_{0.4D}$, $H_{0.6D}$, and $H_{0.8D}$, are the depths of contour lines having radii 0.2 D, 0.4 D, 0.6 D, and 0.8 D, respectively.

13. A focusing screen as recited in claim 10, wherein said focusing screen satisfies the following condition:

$$0.35 < D/P < 0.5$$

where P is the distance between said valleys of adjacent ones of said small lens portions, and D is the radius of said small lens portions.

14. A focusing screen as recited in claim 9, wherein said flat portion is formed so as to be devoid of high spots and low spots.

15. A focusing screen as recited in claim 9, wherein said bulging portion is disposed in a middle portion of said inclined surface between an upper and lower portion, said bulging portion having a less steep inclination than said upper and lower portions of said inclined surface.

16. A focusing screen as recited in claim 9, wherein each of said plurality of small lens portions and said flat portion has an irregular pattern of finer asperities formed thereon.

* * * * *